US011811779B2

(12) United States Patent
Gupta et al.

(10) Patent No.: US 11,811,779 B2
(45) Date of Patent: Nov. 7, 2023

(54) SECURING COLLABORATION TOOLS AGAINST UNAUTHORIZED DATA EXFILTRATION

(71) Applicant: Netskope, Inc., Santa Clara, CA (US)

(72) Inventors: Vanshika Gupta, Banda (IN); Venkataswamy Pathapati, Koduru Mandal (IN); Anupam Kumar, Bengaluru (IN); Muhammed Shafeek, Bangalore (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/669,296

(22) Filed: Feb. 10, 2022

(65) Prior Publication Data

US 2023/0254314 A1    Aug. 10, 2023

(51) Int. Cl.
*H04L 29/06*     (2006.01)
*H04L 9/40*      (2022.01)
*H04L 67/06*     (2022.01)

(52) U.S. Cl.
CPC ........ *H04L 63/102* (2013.01); *H04L 63/0236* (2013.01); *H04L 63/0245* (2013.01);
(Continued)

(58) Field of Classification Search
CPC ............... H04L 63/102; H04L 63/0236; H04L 63/0245; H04L 63/145; H04L 63/20; H04L 67/06
See application file for complete search history.

(56) References Cited

U.S. PATENT DOCUMENTS

| 2011/0023096 A1* | 1/2011 | Xiao ................... H04L 63/0236 709/224 |
| 2013/0174275 A1* | 7/2013 | Micucci .............. H04L 67/1044 726/28 |
| 2017/0264640 A1* | 9/2017 | Narayanaswamy .... H04L 63/10 |

FOREIGN PATENT DOCUMENTS

| WO | WO 2014/138388 | 9/2014 |
| WO | WO 2016/186703 | 11/2016 |

(Continued)

OTHER PUBLICATIONS

U.S. Appl. No. 14/198,499, filed Mar. 5, 2014, Issued.
(Continued)

*Primary Examiner* — Noura Zoubair
(74) *Attorney, Agent, or Firm* — Haynes Beffel & Wolfeld LLP; Ernest J. Beffel, Jr.; Jason Liao

(57) ABSTRACT

The disclosed technology teaches securing a collaboration tool against unauthorized data exfiltration and malicious files, setting policies for file exfiltration to external guest users, uploading users in the external category, and using a proxy that intercepts an add request and response for a collaboration tool. The add response contains a tag identifying the invited user in the category. The request doesn't identify the user as a guest. Also taught is storing metadata identifying the user in the guest category for applying policies, and using a proxy that intercepts a user request and response for file transfer, and looking up and identifying the user as in the category, and applying the applicable policy. Responsive to the policy, included is invoking DPI and detecting that the referenced file contains sensitive information not permitted by the policy to be transferred by the particular user in the external guest category and blocking file transfer.

15 Claims, 11 Drawing Sheets

(52) U.S. Cl.
CPC ............ *H04L 63/145* (2013.01); *H04L 63/20* (2013.01); *H04L 67/06* (2013.01)

(56) References Cited

FOREIGN PATENT DOCUMENTS

WO     WO 2017/156497     9/2017
WO     PCT/US2022/014134     1/2022

OTHER PUBLICATIONS

U.S. Appl. No. 14/198,508, filed Mar. 5, 2014, Issued.
U.S. Appl. No. 14/835,640, filed Aug. 25, 2015, Issued.
U.S. Appl. No. 15/368,246, filed Dec. 2, 2016, Issued.
U.S. Appl. No. 17/163,408, filed Jan. 30, 2021, Issued.
U.S. Appl. No. 17/384,618, filed Jul. 23, 2021, Pending.
U.S. Appl. No. 17/163,411, filed Jan. 30, 2021, Pending.
U.S. Appl. No. 17/163,415, filed Jan. 30, 2021, Pending.
U.S. Appl. No. 17/163,416, filed Jan. 30, 2021, Pending.
Cheng et al., "Cloud Security For Dummies, Netskope Special Edition," John Wiley & Sons, Inc., dated 2015, 53 pages.
"Netskope Introspection," netskope, Inc., 2015, 3 pgs.
Netskope, "Data Loss Prevention and Monitoring in the Cloud", Nov. 2014, 18 pages.
"Cloud Data Loss Prevention Reference Architecture", Netskope, Sep. 2015, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope Inc., EB-141-1, dated 2015, 19 pages.
"Repave the Cloud-Data Breach Collision Course," netskope, Inc., 2014, 6 pgs.
Netskope, "The 5 Steps to Cloud Confidence," netskope Inc., 2014, 11 pgs.
"Netskope Cloud Confidence Index," netskope, Inc., 2015, 4 pgs.
Netskope, "Netskope Active Cloud DLP", 2015, 4 pages.
Yague et al., "A Metadata-based access control model for web services", Computer Science Department, Internet Research, vol. 15, No. 1, University of Malaga, Malaga, Spain, Dec. 31, 2005, pp. 99-116, XP002770914.

* cited by examiner

```
GET https://amer.ng.msg.teams.microsoft.com/v1/users/ME/properties HTTP/1.1    426
Host: amer.ng.msg.teams.microsoft.com
Connection: keep-alive
sec-ch-ua: "Google Chrome";v="95", "Chromium";v="95", ";Not A Brand";v="99"
x-ms-session-id: 7b0d6fc9-c8aa-27b4-e7af-588764f2f2a3
BehaviorOverride: redirectAs404
x-ms-scenario-id: 57
x-ms-client-cpm: ApplicationLaunch
x-ms-client-env: pds-prod-azsc-asse-01
x-ms-client-type: web
sec-ch-ua-mobile: ?0
User-Agent: Mozilla/5.0 (Windows NT 10.0; Win64; x64) AppleWebKit/537.36 (KHTML, like Gecko)
Chrome/95.0.4638.69 Safari/537.36
ClientInfo: os=windows; osVer=10; proc=x86; lcid=en-us; deviceType=1; country=us;
clientName=skypeteams; clientVer=1415/1.0.0.2021103103; utcOffset=+05:30; timezone=Asia/Calcutta
Accept: json
x-ms-client-version: 1415/1.0.0.2021103103
x-ms-user-type: null
Authentication:
skypetoken=eyJhbGciOiJSUzI1NiIsImtpZCI6IjEwMyIsIng1dCI6Ikc5W ...
sec-ch-ua-platform: "Windows"
Origin: https://teams.microsoft.com
Sec-Fetch-Site: same-site
Sec-Fetch-Mode: cors
Sec-Fetch-Dest: empty
Referer: https://teams.microsoft.com/    474
Accept-Encoding: gzip, deflate, br
Accept-Language: en-US,en;q=0.9
```

FIG. 4

HTTP/1.1 200 OK
Cache-Control: no-store, must-revalidate, no-cache
Pragma: no-cache
Content-Length: 17310
Content-Type: application/json; charset=utf-8
Server: Microsoft-HTTPAPI/2.0
Strict-Transport-Security: max-age=31536000; includeSubDomains
Access-Control-Allow-Origin: https://teams.microsoft.com 544
Access-Control-Expose-Headers: ContextId
Access-Control-Allow-Credentials: true
MS-CV: ecvFFXmCQ0WrTbHhP3gKxw.0
ContextId: tcid=0,server=msgapi-production-scus-azsc6-2-103,cv=ecvFFXmCQ0WrTbHhP3gKxw.0
Date: Tue, 09 Nov 2021 03:53:31 GMT
userPinnedApps :
"{"version":"1.0","pinnedAndCoreApps":[{"id":"14d6962d-6eeb-4f48-8890-de55454bb136","name":"Activity","smallImageUrl":"svg/icons-bell.html","isCoreApp":true,"isAppBarPinned":true,"appBarOrder":1,"state":"InstalledAndPermanent"},{"id":"20c3440d-c67e-4420-9f80-0e50c39693df","name":"Calling","smallImageUrl":"svg/icons-call.html","isCoreApp":true,"isAppBarPinned":true,"appBarOrder":5,"state":"InstalledAndPermanent"},{"id":"2a84919f-59d8-4441-a975-2a8c26643b741","name":"Teams","smallImageUrl":"svg/icons-teams-medium.html","isCoreApp":true,"isAppBarPinned":true,"appBarOrder":3,"state":"InstalledAndPermanent"},{"id":"34b01851-c13d-4604-bb3b-5de1ecbf0288","name":"Saved","smallImageUrl":"svg/icons-bookmark.html","isCoreApp":true,"state":"InstalledAndPermanent"},{"id":"5af6a76b-40fc-4ba1-af29-8f49b08e44fd","name":"Files","smallImageUrl":"svg/icons-document.html","isCoreApp":true,"isAppBarPinned":true,"appBarOrder":6,"state":"InstalledAndPermanent"},{"id":"86fcd49b-61a2-4701-b771-54728cd291fb","name":"Chat","smallImageUrl":"svg/icons-chat-medium.html","isCoreApp":true,"isAppBarPinned":true,"appBarOrder":2,"state":"InstalledAndPermanent"},{"id":"a2da8768-95d5-419e-9441-3b539865b118","name":"Search","smallImageUrl":"svg/icons-search.html","isCoreApp":true,"state":"InstalledAndPermanent"},{"id":"ef56c0de-36fc-4ef8-b417-3d82ba9d073c","name":"Calendar","smallImageUrl":"svg/icons-calendar-medium.html","isCoreApp":true,"isAppBarPinned":true,"appBarOrder":4,"state":"InstalledAndPermanent"}]}"
freSent : "RequestFRE"

FIG. 5A userPersonalSettings : 514

"{"emailSettings":{"EmailNotificationDelay":"Hourly","Mention_Person":true,"MentionInChat_Person":true,"Mention_Channel":true,"Mention_Team":true,"Like":false,"LikeInChat":false,"Reply":false,"ReplyToReply":false,"Chat":true,"TeamMembershipChange_AddedToTeam":false,"TeamMembershipChange_PromotedToTeamAdmin":false,"Follow_ChannelNewMessage":true,"Follow_ChannelReplyMessage":true,"Visible_ChannelNewMessage":true,"Visible_ChannelReplyMessage":true,"Visible_ChannelMention":true,"Inferred":false,"DLP_NotifySender":false,"Trending":false,"TeamMembershipChange_PendingOnBehalfOfJoinRequest":true,"TeamMembershipChange_PendingSelfJoinRequest":true},"toastSettings":{"Mention_Person":true,"MentionInChat_Person":true,"Mention_Channel":true,"Mention_Team":true,"Like":true,"LikeInChat":true,"Reply":true,"ReplyToReply":true,"Chat":true,"TeamMembershipChange_AddedToTeam":true,"TeamMembershipChange_PromotedToTeamAdmin":true,"Download_DownloadStarted":true,"Download_DownloadFailed":true,"MeetingWentLiveNotification":true,"ThirdParty_Bot":true,"Follow_ChannelNewMessage":true,"Follow_ChannelReplyMessage":true,"Visible_ChannelNewMessage":false,"Visible_ChannelReplyMessage":false,"Visible_ChannelMention":true,"MessageSendFailed":true,"Inferred":false,"Trending":false,"TeamMembershipChange_PendingOnBehalfOfJoinRequest":true,"CallTransferFailed":true,"PresenceStatus":true,"TeamMembershipChange_PendingSelfJoinRequest":true,"TeamsEngagementActivity_WelcomeNewUser":true},"activityGenerationSettings":{"Mention_Person":true,"MentionInChat_Person":true,"Mention_Channel":true,"Mention_Team":true,"Like":true,"LikeInChat":true,"Reply":true,"ReplyToReply":true,"Chat":true,"TeamMembershipChange_AddedToTeam":true,"TeamMembershipChange_PromotedToTeamAdmin":true,"Follow_ChannelNewMessage":true,"Follow_ChannelReplyMessage":true,"Visible_ChannelNewMessage":false,"Visible_ChannelReplyMessage":false,"Visible_ChannelMention":true,"Inferred":true,"Trending":true,"DLP_NotifySender":true,"Priority":true,"TeamMembershipChange_PendingOnBehalfOfJoinRequest":true,"TeamMembershipChange_PendingSelfJoinRequest":true},"soundsSettings":{"alertSound":"CallMentionChats"},"sfbSettings":{"enableSfBInterop":true},"chatSettings":{"meetingChatNotification":"participated"},"filesSettings":{"fileOpenPreference":"teamsV2","nonFileOpenPreferenceSelectedCount":2}}"
readReceiptsEnabled : "true"
personalSharedNoteBook :
"{"personalSharedNotebookId":"1-d3ce41ad-55a1-4cc2-8bd0-8e13da3c700a","personalSharedNotebookUrl":"https://hippoqa-my.sharepoint.com/personal/automation_hippoqa_onmicrosoft_com/Documents/Notebooks/TeamsNotebook(Shared)"}"
isSkypeTeamsUserSetInSettingsStore : "True"

FIG. 5B userDetails :
"{"name":"automation","upn":"automation@hippoqa.onmicrosoft.com"}" 516
suggestedRepliesSettings : "{}"
firstLoginInformation :
"{"Web":"2021-10-12T03:53:22.426Z","espFirstRunStarted":"2021-10-12T03:53:22.426Z","espFirstRunCompleted":"2021-10-12T03:53:50.232Z","electron":"2021-10-13T01:45:09.790Z"}"
cortanaSettings : "{}"
locale : "en-us"
contactsTabLastVisitTime : "1634009832279"
autoUnfavoriteTeams : "[]"
suggestedContacts :
"[{"userPrincipalName":"shamanth@hippoqa.onmicrosoft.com","email":"shamanth@hippoqa.onmicrosoft.com","isShortProfile":true,"displayName":"Shamanth Jain","mri":"8:orgid:0334962d-b7a6-4d90-b4c5-5ff0ea9a8eb9","objectId":"0334962d-b7a6-4d90-b4c5-5ff0ea9a8eb9"},{"userPrincipalName":"shamanth@hipposkope.com","email":"shamanth@hipposkope.com","isShortProfile":true,"displayName":"Shamanth Jain","mri":"8:orgid:b6d75380-523d-4487-ac7c-39847ba9628c","objectId":"b6d75380-523d-4487-ac7c-39847ba9628c"},{"userPrincipalName":"user1@hipposkope.com","email":"user1@hipposkope.com","isShortProfile":true,"displayName":"user1","mri":"8:orgid:29cbf846-5dde-453e-bc9b-b03364eaacca","objectId":"29cbf846-5dde-453e-bc9b-b03364eaacca"},{"userPrincipalName":"user2@hipposkope.com","email":"user2@hipposkope.com","isShortProfile":true,"displayName":"user2","mri":"8:orgid:341c9ab2-6299-4d17-b8d6-9727bae0a757","objectId":"341c9ab2-6299-4d17-b8d6-9727bae0a757"},{"userPrincipalName":"test_user1@hippoqa.onmicrosoft.com","email":"test_user1@hippoqa.onmicrosoft.com","isShortProfile":true,"displayName":"admin","mri":"8:orgid:eff846a9-d936-4719-bbbe-21dbe19bba81","objectId":"eff846a9-d936-4719-bbbe-21dbe19bba81"}]"
cid : "0"
cidHex : "0000000000000000"
dogfoodUser : false
primaryMemberName : "orgid:d941aa60-a15b-4e8d-b28c-6f7ddcabeb52"
skypeName : "orgid:d941aa60-a15b-4e8d-b28c-6f7ddcabeb52"

FIG. 5C

```
GET https://amer.ng.msg.teams.microsoft.com/v1/users/ME/properties HTTP/1.1  616
Host: amer.ng.msg.teams.microsoft.com
Connection: keep-alive
sec-ch-ua: "Google Chrome";v="95", "Chromium";v="95", ";Not A Brand";v="99"
x-ms-session-id: 29edb718-c5d1-d2db-813f-287ebc06e93b
BehaviorOverride: redirectAs404
x-ms-scenario-id: 57
x-ms-client-cpm: ApplicationLaunch
x-ms-client-env: pckgsvc-prod-c1-asse-01
x-ms-client-type: web
sec-ch-ua-mobile: ?0
User-Agent: Mozilla/5.0 (Windows NT 10.0; Win64; x64) AppleWebKit/537.36 (KHTML, like Gecko) Chrome/95.0.4638.69 Safari/537.36
ClientInfo: os=windows; osVer=10; proc=x86; lcid=en-us; deviceType=1; country=us; clientName=skypeteams; clientVer=1415/1.0.0.2021103103; utcOffset=+05:30; timezone=Asia/Calcutta
Accept: json
x-ms-client-version: 1415/1.0.0.2021103103
x-ms-user-type: null
Authentication:
skypetoken=eyJhbGciOiJSUzI1NiIsImtpZCI6IjEwM...
sec-ch-ua-platform: "Windows"
Origin: https://teams.microsoft.com
Sec-Fetch-Site: same-site
Sec-Fetch-Mode: cors
Sec-Fetch-Dest: empty
Referer: https://teams.microsoft.com/  674
Accept-Encoding: gzip, deflate, br
Accept-Language: en-US,en;q=0.9
```

FIG. 6

HTTP/1.1 200 OK
Cache-Control: no-store, must-revalidate, no-cache
Pragma: no-cache
Content-Length: 2693
Content-Type: application/json; charset=utf-8
Server: Microsoft-HTTPAPI/2.0
Strict-Transport-Security: max-age=3136000; includeSubDomains
Access-Control-Allow-Origin: https://teams.microsoft.com 724
Access-Control-Expose-Headers: ContextId
Access-Control-Allow-Credentials: true
MS-CV: db/xNeVts0upk32JPFLdTQ.0
ContextId: tcid=0,server=msgapi-production-scus-azsc6-2-204,cv=db/xNeVts0upk32JPFLdTQ.0
Date: Tue, 09 Nov 2021 03:54:14 GMT
{
"userPinnedApps":

"{\"version\":\"4.0\",\"pinnedAndCoreApps\":[{\"id\":\"14d6962d-6eeb-4f48-8890-de55454bb136\",\"name\":\"Activity\",\"smallImageUrl\":\"svg/icons-bell.html\",\"isCoreApp\":true,\"isAppBarPinned\":true,\"appBarOrder\":1,\"state\":\"InstalledAndPermanent\"},{\"id\":\"20c3440d-c67e-4420-9f80-0e50c39693df\",\"name\":\"Calling\",\"smallImageUrl\":\"svg/icons-call.html\",\"isCoreApp\":true,\"isAppBarPinned\":true,\"appBarOrder\":5,\"state\":\"InstalledAndPermanent\"},{\"id\":\"2a84919f-59d8-4441-a975-2a8c2643b741\",\"name\":\"Teams\",\"smallImageUrl\":\"svg/icons-teams-medium.html\",\"isCoreApp\":true,\"isAppBarPinned\":true,\"appBarOrder\":3,\"state\":\"InstalledAndPermanent\"},{\"id\":\"34b01851-c13d-4604-bb3b-5de1ecbf0288\",\"name\":\"Saved\",\"smallImageUrl\":\"svg/icons-bookmark.html\",\"isCoreApp\":true,\"state\":\"InstalledAndPermanent\"},{\"id\":\"5af6a76b-40fc-4ba1-af29-8f49b08e44fd\",\"name\":\"Files\",\"smallImageUrl\":\"svg/icons-document.html\",\"isCoreApp\":true,\"isAppBarPinned\":true,\"appBarOrder\":6,\"state\":\"InstalledAndPermanent\"},{\"id\":\"86fcd49b-61a2-4701-b771-54728cd291fb\",\"name\":\"Chat\",\"smallImageUrl\":\"svg/icons-chat-medium.html\",\"isCoreApp\":true,\"isAppBarPinned\":true,\"appBarOrder\":2,\"state\":\"InstalledAndPermanent\"},{\"id\":\"a2da8768-95d5-419e-9441-3b5398365b118\",\"name\":\"Search\",\"smallImageUrl\":\"svg/icons-search.html\",\"isCoreApp\":true,\"state\":\"InstalledAndPermanent\"},{\"id\":\"ef56c0de-36fc-4ef8-b417-3d82ba9d073c\",\"name\":\"Calendar\",\"smallImageUrl\":\"svg/icons-calendar-medium.html\",\"isCoreApp\":true,\"isAppBarPinned\":true,\"appBarOrder\":4,\"state\":\"InstalledAndPermanent\"}],\"setupPolicyOverridesUserPinnedOrder\":false,\"userPinningAllowed\":true}",

FIG. 7A

```
"teamsOrder":
"[{\"order\":0,\"teamId\":\"19:UFFNh7_1PZmv2VlL_cszEk2IUn3l14XtHf8rcNAKu3o1@thread.tacv2\"}]",
"readReceiptsEnabled": "true",
"suggestedRepliesSettings": "{}",
"userDetails":    732
"{\"name\":\"automation_hippoqa\",\"upn\":\"automation_hippoqa.onmicrosoft.com#EXT#@qascope.onmicrosoft.com\"}",
"isSkypeTeamsUserSetInSettingsStore": "True",
"cortanaSettings": "{}",
"personalFileSite": "{\"availability\":2,\"lastModifiedTime\":\"2020-09-30T10:32:11.0918409Z\"}",
"favorites": "{}",
"firstLoginInformation":
"{\"electron\":\"2021-09-20T05:33:02.745Z\",\"Web\":\"2021-09-20T06:02:46.830Z\",\"espFirstRunStarted\"
:\"2021-09-20T06:02:46.830Z\",\"PromptCards\":\"2021-09-20T06:02:49.884Z\",\"espFirstRunCompleted\"
:\"2021-09-20T06:02:49.886Z\"}",
"locale": "en-us",
"cid": "0",
"cidHex": "0000000000000000",
"dogfoodUser": false,
"primaryMemberName": "orgid:f534b153-b539-4b4c-a024-bfeb79b068f8",
"skypeName": "orgid:f534b153-b539-4b4c-a024-bfeb79b068f8"
}
```

FIG. 7B

SECURING COLLABORATION TOOLS AGAINST UNAUTHORIZED DATA EXFILTRATION

INCORPORATIONS

The following materials are incorporated by reference for all purposes as if fully set forth herein:

U.S. Non-Provisional Patent Application No. 17/384,618 titled "Computer-Based Policy Manager for Cloud-Based Unified Functions, " filed 23 Jul. 2021 which is a continuation of U.S. application Ser. No. 17/163,408 titled "Unified Policy Enforcement Management in the Cloud", filed on 30 Jan. 2021, now U.S. Pat. No. 11,159,576, issued 26 Oct. 2022; and U.S. Non-Provisional patent application Ser. No. 17/163,411 titled "Dynamic Distribution of Unified Policies in a Cloud-Based Policy Enforcement System", filed on 30 Jan. 2021; and U.S. Non-Provisional patent application Ser. No. 17/163,415 titled "Dynamic Routing of Access Request Streams in a Unified Policy Enforcement System", filed on 30 Jan. 2021; and U.S. Non-Provisional Patent Application No. 17/163,416 titled "Unified System for Detecting Policy Enforcement Issues in a Cloud-Based Environment," filed on 30 Jan. 2021.

U.S. Non-Provisional application Ser. No. 14/198,499, titled "Security for Network Delivered Services", filed Mar. 5, 2014, now U.S. Pat. No. 9,398,102, issued on Jul. 19, 2016, U.S. Non-Provisional application Ser. No. 14/198,508, titled "Security for Network Delivered Services", filed on Mar. 5, 2014, now U.S. Pat. No. 9,270,765, issued Feb. 23, 2016, U.S. Non-Provisional application Ser. No. 14/835,640, titled "Systems and Methods of Monitoring and Controlling Enterprise Information Stored on a Cloud Computing Service (CCS)", filed on Aug. 25, 2015, now U.S. Pat. No. 9,928,377, issued on Mar. 27, 2018, U.S. Non-Provisional application Ser. No. 15/368,246, titled "Middle Ware Security Layer for Cloud Computing Services", filed on Dec. 2, 2016, which claims the benefit of U.S. Provisional Application No. 62/307,305, titled "Systems and Methods of Enforcing Multi-Part Policies om Data-Deficient Transactions of Cloud Computing Services", filed on Mar. 11, 2016, "Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed relates generally to cloud-based security and cybersecurity attacks. More specifically the disclosed technology relates to securing against unauthorized data exfiltration and preventing malware attacks via a collaboration tool platform. Further disclosed is fine-grained control by Netskope customers over the user actions performed in a sanctioned Teams workspace and in an unsanctioned Teams workspace.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Keeping connected to external business is crucial to communication and collaboration in the modern business world. Cloud-based computing and the demand to be able to work from anywhere, anytime are two factors that are accelerating the push for comprehensive security access service edge systems that address the need for secure access to data from any device at any time and from any location.

Cybercriminals see the cloud as an effective method for subverting detection. Patterns of cyberthreats and malicious insiders change constantly. Meanwhile, sensitive data is increasingly distributed and moving to platforms that are not necessarily sanctioned or properly secured. Security policies often need to be evaluated for individual users in real time, for example, when users are uploading and downloading files, browsing websites or accessing data in the cloud. Millions of critical decisions that impact user experience need to be made every day.

A collaboration tool is a platform which brings different teams together with different resources such as chat, meeting, threaded conversation, conference communication and sharing of content. In one example, Microsoft Team's switching tenant feature allows users to have a cross-tenant access to different team workspaces (teams), which enables users to access multiple tenant-provisioned team workspaces without having logged into each tenant. In another example, Slack offers collaboration tools.

Microsoft Teams sanctioned account users can get a guest invitation from the external/unsanctioned account to join their Team workspace as a consultant or other customer, for example. Once the internal user accepts the invitation, they can switch between internal sanctioned and external unsanctioned tenant Team workspaces instances. This allows the user to perform Post, Upload, Share of sensitive content in the unsanctioned tenant team workspace. These features allow users to access different tenant team workspaces which supports effective content collaboration. This also brings a risk of data exfiltration to an unsanctioned tenant from the sanctioned tenant, and brings a risk of phishing attack by external users, such as by downloading shared malicious content.

An opportunity arises for securing a collaboration tool against unauthorized data exfiltration. An opportunity also emerges for enabling customers to have fine-grained control over the user actions performed in sanctioned and unsanctioned teams tenant instances.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 shows a request for a user who is internal to an organization to access an instance of Teams of the same organization.

FIG. 5A lists example response metadata, in JSON, for a user who is internal to an organization to access an instance of Teams of the same organization (such as for the request).

FIG. 5B lists the personal user settings in the response header, for a user who is internal to an organization to access an instance of Teams of the same organization (such as for the request).

FIG. 5C lists response metadata that includes user detail, with the name of the user, for a user who is internal to an organization to access an instance of Teams of the same organization (such as for the request).

FIG. 6 shows a request for external access by a user who is external to an organization, to access an instance of Teams internal to a different organization.

FIG. 7A shows an example response, by Microsoft Teams, for a user who is external to an organization, to access an instance of Teams of a different organization than the requestor.

FIG. 7B lists the lists response metadata, which includes user detail.

DETAILED DESCRIPTION

Figure 1:
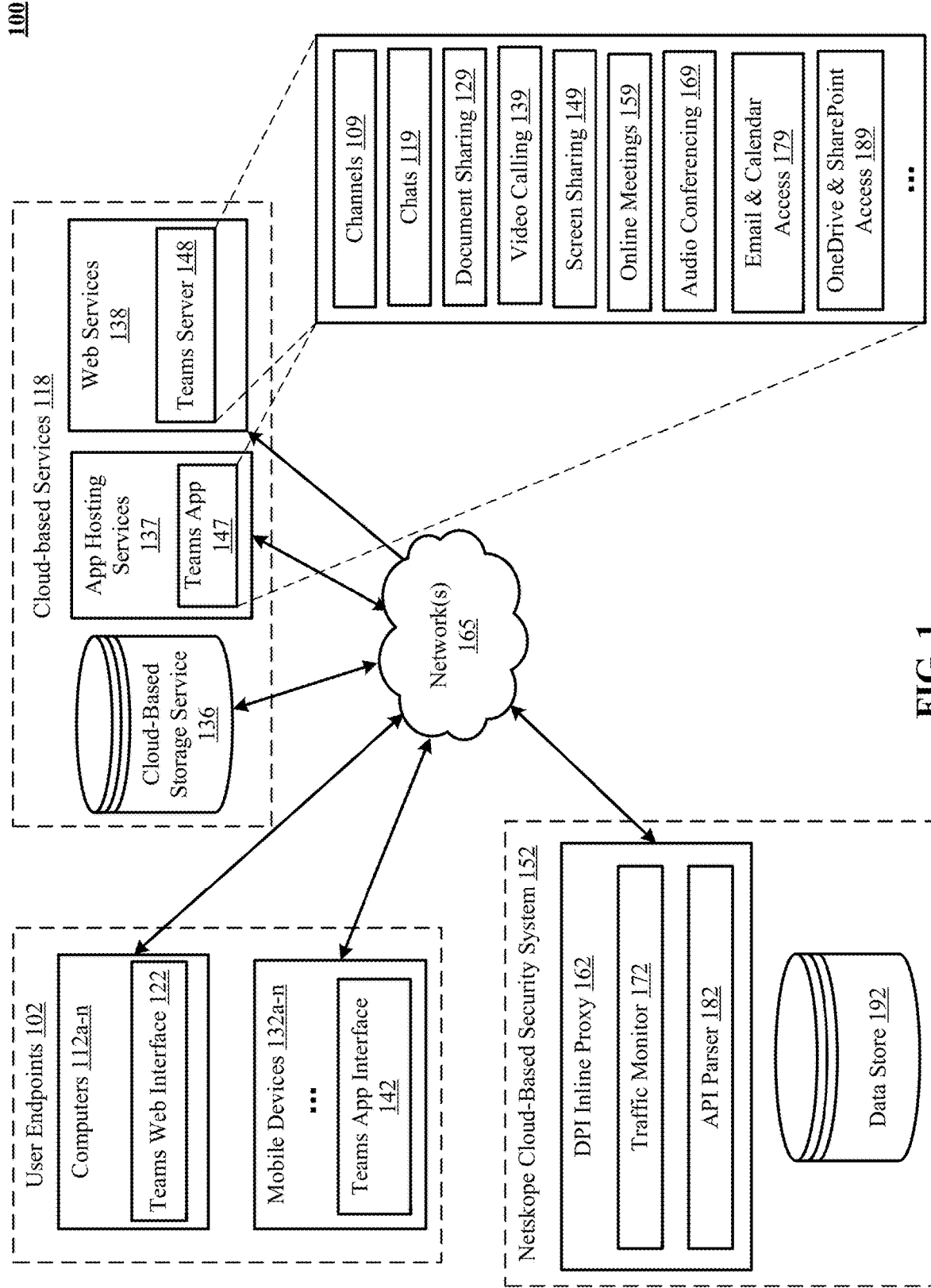
FIG. 1 illustrates an architectural level schematic of a system for securing Teams against unauthorized data exfiltration and against receiving malicious files from external users, in accordance with an implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Sanctioned account users of Microsoft Teams can receive a guest invitation to join the Team workspace of an unsanctioned account user. Once the sanctioned user accepts the invitation from the unsanctioned account, they can switch between their internal sanctioned Team workspace instance and the external unsanctioned tenant Team workspace instance, resulting in the ability to post, upload and share sensitive content in the unsanctioned Team workspace. The risk of data exfiltration to an unsanctioned tenant from the sanctioned tenant is a consequence of this feature, along with the risk of phishing attack by external users, such as by downloading shared malicious content.

Features of a collaboration tool include channels and conversations within channels and teams for collaborating in real time, as well as a chat function, commonly accessible documents and document storage, online video calling and screen sharing, online meetings, audio conferencing, and full telephony, in addition to direct access to email, Skype, OneDrive and SharePoint, and usage reports.

Microsoft Teams currently implements no policies and provides no settings restrictions for controlling access to an external tenant Team workspace, or for preventing data exfiltration after acceptance of a guest tenant invitation.

The disclosed technology enables collaboration between users of different organizations via the exchange of data, without leaking sensitive information, by identifying the tenant identity of an organization user performing actions, such as post message, file upload and file download in MS Teams channel and tagging correctly as an external or internal org. Identifying tenant identity enables policy enforcement, so that actions can be taken to protect sensitive data. The technology disclosed extracts the details for sanctioned tenants and for unsanctioned tenants, from the traffic. The technology also enables customers to have fine-grained control over the user actions performed in sanctioned and unsanctioned tenant instances.

The technology disclosed solves the technical problem of identifying the tenant instance to which the Team workspace belongs when a user performs data exfiltration actions. This enables fine-grained control over the user actions performed in a sanctioned and an unsanctioned workspace, by network security service administrators of customers.

Using the disclosed technology, customers can create instance-based constraint policies to block any sensitive content shared with users that belong to an external organization and allow the sensitive actions only for users within the internal corporate tenant, thus enabling protection from data exfiltration and receipt of malicious files from external users of Teams.

Next, we describe an architecture for securing Teams against unauthorized data exfiltration, and against receiving malicious files from external users.

Architecture

FIG. 1 shows an architectural level schematic of a system 100 for securing Teams against unauthorized data exfiltration, and against receiving malicious files from external users. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

FIG. 1 includes the system 100 with user endpoints 102 and a cloud-based hosting service 118 with app hosting services 137 for hosting a native Teams app 147 as well as other apps, web services 138 with Teams server 148, and a cloud-based storage service 136, System 100 also includes a Netskope cloud-based security system 152 with deep packet inspection (DPI) inline proxy 162, and a network(s) 165. App hosting services 137, web services 138, and cloud-based storage services 136 are collectively referred to as cloud-based services 118. User endpoints 102 such as computers 112a-n, tablets 122a-n and mobile devices 132a-n (such as cell phones) access and interact with data stored on the cloud-based services 118. This access and these interactions are modulated by an inline proxy 162 that is interposed between the user endpoints and the cloud-based services 118. The inline proxy 162 uses a traffic monitor 172 and API (application programming interface) parser 182 to monitor bidirectional traffic that flows from the user endpoints 102 that utilize Teams web interface 122 and Teams app interface 142 to Teams server 148 in cloud-based services 118. The inline proxy 162 can be a cloud-based proxy or located on premise.

User endpoints 102 can be desktop computers, laptops, tablet computers, mobile phones, or any other type of computing devices. The engines or system components of environment 100 such as the network security system 155 are implemented by software running on varying types of computing devices. Example devices are a workstation, a server, a computing cluster, a blade server, and a server farm.

Having introduced the elements of FIG. 1 and their interconnections, elements of the figure are now described in greater detail.

Teams app 147 and Teams server 148 each access Teams features: channels 109, chats 119, document sharing 129, video calling 139, screen sharing 149, online meetings 159, audio conferencing 169, email and calendar access 179, and OneDrive and SharePoint access 189 and additional features as well.

DPI inline proxy 162 performs deep packet inspection on incoming live software as a service (SaaS) traffic and on traffic from guest tenants added via Teams web interface 122 and via Teams app interface 142. DPI inline proxy 162 provides tenant detection visibility and policy control of incoming requests for post, upload and share requests for sensitive content in an unsanctioned Team workspace. DPI inline proxy 162 also detects attempts to download shared malicious content to lessen the risk of phishing attack by external users.

In a "managed device" implementation, user endpoints 102 are configured with routing agents (not shown) which ensure that requests for the cloud-based services 118 originating from the user endpoints 102 and responses to the requests are routed through the inline proxy 162 for policy enforcement. Once the user endpoints 102 are configured with the routing agents, they are under the ambit or purview of the inline proxy 162, regardless of their location (on premise or off premise).

In an "unmanaged device" implementation, certain user endpoints that are not configured with the routing agents can still be under the purview of the inline proxy 162 when they are operating in an on-premises network monitored by the inline proxy 162.

The interconnection of the elements of system 100 will now be described. The network(s) 165 couples the computers 112a-n, the tablets 122a-n, the mobile devices 132a-n, the cloud-based services 118, and the DPI inline proxy 162 in communication with each other (indicated by solid double-arrowed lines). The communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, SecureID, digital certificates and more, can be used to secure the communications.

The cloud-based services 118 provide functionality to users that is implemented in the cloud or on the Internet. The cloud-based services 118 can include Internet hosted services such as news websites, blogs, video streaming websites, social media websites, hosted services, cloud applications, cloud stores, cloud collaboration and messaging platforms, and/or cloud customer relationship management (CRM) platforms. Cloud-based services 118 can be accessed using a browser (e.g., via a URL) or a native application (e.g., a sync client). Categories of cloud-based services include software-as-a-service (SaaS) offerings, platform-as-a-service (PaaS) offerings, and infrastructure-as-a-service (IaaS) offerings. Enterprise applications exposed via URLs/APIs can fit in a category of service supported by a category-directed parser or a category-directed parser could be written for an enterprise applications category of service. Examples of common web services today include YouTube™, Facebook™, Twitter™, Google™, LinkedIn™ Wikipedia™, Yahoo™, Baidu™, Amazon™, MSN™, Pinterest™, Taobao™, Instagram™ Tumblr™, eBay™, Hotmail™, Reddit™ IMDb™, Netflix™, PayPal™, Imgur™, Snapchat™ Yammer™, Skype™, Slack™, HipChat™, Confluence™, TeamDrive™, Taskworld™, Chatter™, Zoho™, ProsperWorks™, Google's Gmail™, Salesforce.com™, Box™, Dropbox™ Google Apps™, Amazon AWS™, Microsoft Office 365™, Workday™, Oracle on Demand™ Taleo™, Jive™, and Concur™.

The cloud-based services 118 provide functionality to the users of the organization that is implementing security policies. When a user sends a request to a cloud-based service via an endpoint 112a, the inline proxy 162 intercepts the request message. In one implementation, the inline proxy 162 uses a domain name in a uniform resource locator used to access the API to identify the cloud-based service being accessed.

User identity refers to an indicator that is provided by the network cloud-based security system 152 to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g., Microsoft's Active Directory (AD). Such embodiments may allow policies to be defined in the directory, e.g., either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor, e.g., a dedicated account held by the system that holds the only credentials to sign into the service. In other embodiments, the client may encrypt the sign on credentials before passing the login to the hosted service, meaning that the networking security system "owns" the password.

Data store 192 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based services 118. Non-structured data, such as free text, can also be provided by, and targeted back to cloud services 118.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

In addition to periodically generating the user-by-user data and the file-by-file data and persisting it in a metadata store, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog *Cloud Security For Dummies, Netskope Special Edition,* John Wiley & Sons, Inc. 2015; *"Netskope Introspection"* by Netskope, Inc.; *"Data Loss Prevention and Monitoring in the Cloud"* by Netskope, Inc.; *"Cloud Data Loss Prevention Reference Architecture"* by Netskope, Inc.; *"The 5 Steps to Cloud Confidence"* by Netskope, Inc.; *"The Netskope Active Platform"* by Netskope, Inc.; *"The Netskope Advantage: Three "Must-Have" Requirements for Cloud Access Security Brokers"* by Netskope, Inc.; *"The* 15 *Critical CASB Use Cases"* by Netskope, Inc.; *"Netskope Active Cloud DLP"* by Netskope, Inc.; *"Repave the Cloud-Data Breach Collision Course"* by Netskope, Inc.; and *"Netskope Cloud Confidence Index™"* by Netskope, Inc., which are incorporated by reference for all purposes as if fully set forth herein.

Figure 2:
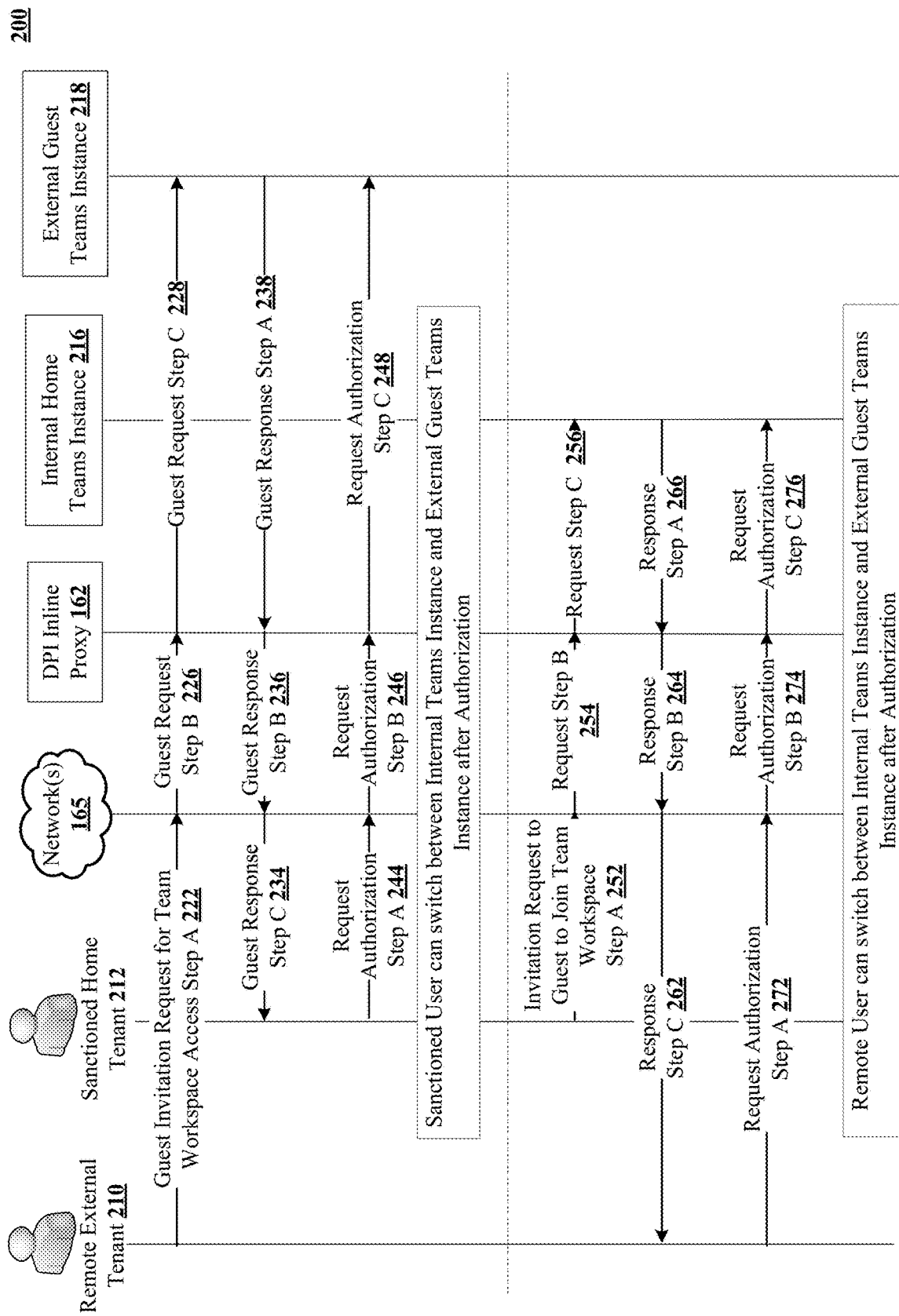
FIG. 2 shows two message flows. The first is a message flow for a guest invitation to a sanctioned tenant user, from a remote external guest, to an external guest teams instance. The second message flow is an invitation from a sanctioned tenant user to a remote external guest to access an internal sanctioned instance of MS Teams.

FIG. 2 shows two message flows. The first is a message flow for a guest invitation to a sanctioned tenant user, from a remote external guest, to an external guest teams instance. The second message flow is an invitation from a sanctioned tenant user to a remote external guest to access an internal sanctioned instance of MS Teams. Sanctioned home tenant 212 represents a user inside an organization instance who can post, upload and download files to other sanctioned users. Remote external tenant 210 represents a guest user who is outside the home organization.

In the first message flow, an external user invites a sanctioned home user to use their remote Teams instance. Remote external tenant 210 generates a guest invitation for Team workspace access for home tenant 212. Guest invitation request for team workspace access step A 222 travels through network 165, and guest request step B 226 travels through DPI inline proxy 162. Guest request step C 228 arrives at external guest teams instance 218, which generates a guest response invitation step A 238 which travels through DPI inline proxy 162, and guest response step B 236 travels via network 165, and guest response step C 234 delivers the guest invitation response to home tenant 212. Home tenant 212 sends request authorization step A 244 via network 165 and request authorization step B 246 travels through DPI inline proxy 162, and external guest teams instance 218 receives request authorization step C 248 and authorizes access to home tenant 212. The sanctioned user can switch between Internal Teams Instance 216 and External Guest Teams Instance 218 after authorization.

In the second message flow, a sanctioned home user invites an external guest to access their internal home Teams instance. Home tenant 212 generates a guest invitation for Team workspace access for remote external tenant 210. Invitation to guest to join team workspace request access step A 252 travels through network 165, and request step B 254 travels through DPI inline proxy 162. Request step C 256 arrives at internal home teams instance 216, which generates a guest invitation response step A 266 which travels through DPI inline proxy 162. Response step B 264 travels via network 165 and response step C 262 delivers the invitation response to remote external tenant 210. Remote external tenant 210 sends request authorization step A 272 via network 165. Request authorization step B 274 travels through DPI inline proxy 162 and internal home teams instance 216 receives request authorization step C 276 and authorizes access to home tenant 212 for remote external tenant 210. The remote user can switch between Internal Teams Instance 216 and External Guest Teams Instance 218 after authorization.

In both cases described in the two message flows shown in FIG. 2, DPI inline proxy 162 intercepts a pair of an add request and add response for adding an invited user to a team, and extracts the sanctioned tenant details and unsanctioned tenant details from the traffic. The add response contains a tag identifying the invited user as belong to the external guest user category, but the add request itself does not identify the invited user as belonging to the external guest user category. Examples with JSON details are described below. DPI inline proxy 162 stores the extracted tenant details in data store 192, and performs a lookup for other requests, such as file transfer to retrieve external information and policy for requests for post, upload and download, and other actions specifiable in policy for the tenant. DPI inline proxy 162 sets and applies policies applicable to exfiltration of files to users in an external guest user category. This disclosed technology enables users of different organizations to collaborate and exchange data without leaking of sensitive data files.

Figure 3:
FIG. 3 shows an example Microsoft Teams user interface.

FIG. 3 shows an example Microsoft Teams 322 user interface, with teams 342, and actions available 326. The UI also illustrates the 'join or create a team' feature 384.

Next, FIG. 4 through FIG. 7B display examples of request and response header metadata that DPI inline proxy 162 extracts in the sanctioned tenant details and in the unsanctioned tenant details from the traffic.

FIG. 4 shows a request for a user who is internal to an organization to access an instance of Teams of the same organization. That is, FIG. 4 shows a request for internal access to Teams 426, listing the internal request header metadata in JSON. Internal refers to a sanctioned user within an organization. The JSON metadata reflects that the referrer is indeed Microsoft Teams 474.

FIG. 5A, FIG. 5B and FIG. 5C show an example response, by Microsoft Teams, to a request such as is illustrated in FIG. 4, for a user who is internal to an organization to access an instance of Teams of the same organization (such as for the request). The internal response header metadata is in JSON, and FIG. 5A lists metadata that specifies the access control allow origin as https://teams.microsoft.com 544. FIG. 5B lists the personal user settings 514 in the response header. FIG. 5C lists response metadata that includes user detail, with the name of the user 516.

FIG. 6 shows a request for external access by a user who is external to an organization, to access an instance of Teams internal to a different organization. That is, FIG. 6 shows a request for external access to Microsoft Teams 616, listing the external request header metadata in JSON. Internal refers to a sanctioned user within an organization. The JSON metadata reflects that the referrer is Microsoft Teams 674.

FIG. 7A and FIG. 7B show an example response, by Microsoft Teams, to a request such as the external request illustrated in FIG. 6, for a user who is external to an organization, to access an instance of Teams of a different organization than the requestor. The external response header metadata is listed in JSON. FIG. 7A lists metadata that specifies the access control allow origin as https://teams.microsoft.com 724. FIG. 7B lists the lists response metadata that includes user detail 732 in the response header, also listed below.

"userDetails":

"{\"name\":\"automation_hippoqa\",\"upn\":
\"automation_hippoqa.onmicrosoft.com#EXT#@
qascope.onmicrosoft.com\"}"

DPI inline proxy 162 intercepts 'add' request and 'add' response pairs for adding users to Teams. The add response contains a tag identifying the add request as involving an invited user in an external guest user category, but the add request itself does not identify that the invited user as in the external guest user category. The #EXT# pattern represents external tenant details, in the metadata for the response to the request, for adding an invited user in an external guest user category, with traffic capture carrying the external guest user's details for MS Teams. This JSON text pattern represents external tenant detail information.

DPI inline proxy 162 parses a particular request and particular response for file transfer and extracts the particular user to whom the file is to be transferred, from json key-value details present in live traffic.

Including the #EXT# tag identifying the add request as involving an invited user in an external guest user category.

DPI inline proxy 162 looks up the particular user identified as being an external guest user, and applies at least one policy, applicable to exfiltration of files to users in an external guest user category, so applicable to the particular request for file transfer.

DPI inline proxy 162 invokes deep packet inspection (DPI) as required by the policy and can detect whether a file requested in the particular request contains sensitive information not permitted by the policy. If the file contains sensitive information, DPI inline proxy responds accordingly.

In a parallel inspection, DPI inline proxy 162 intercepts particular request and response pairs for file transfer for transfer from a particular user, wherein neither a particular request nor a particular response for file transfer in the particular pair indicate whether the particular user is in the external guest user category. DPI inline proxy 162 parses the particular request and particular response for file transfer and extracts the particular user from whom the file is to be transferred. DPI inline proxy 162 looks up the particular user, in the external guest user category, looks up at least one policy applicable to the guest user category, and applies the policy to the particular request for file transfer. DPI inline proxy 162 invokes deep packet inspection (DPI) as required by the policy and can detect whether a file requested to be sent in the particular request contains sensitive information not permitted by the policy. If the file contains sensitive information, DPI inline proxy responds accordingly.

In one example of exercising the disclosed technology, two instance-based policies for Microsoft Teams are created with selected activity, specifying a policy to block an external corporate instance and allow a specific internal corporate instance. Then, the user logs into the internal corporate instance account @hippoqa.onmicrosoft.com and performs actions, including posting sensitive content. The action gets allowed as it belongs to a sanctioned instance. Then the user switches to another instance @qascope.onmicrosoft.com within the Teams, with the same account, and performs a sensitive activity, and the action gets blocked due to belonging to a corporate external org instance.

In this example, DPI inline proxy 162 leverages existing field 'instance_id' to populate tenant details. When the user logs in with a sanctioned internal account such as test_user1@hippoqa.onmicrosoft.com, the tenant to which user belongs is tenant_name 'hippoqa'. DPI inline proxy 162 parses this information from live traffic to extract the data details and populate an event and apply granular tenant-based policies. Alternatively, when the user logs in with sanctioned internal account test_user1@hippoqa.onmicrosoft.com and switches to an external unsanctioned tenant for which user has been added as a guest user to collaborate as xyz@qascope.onmicrosoft.com, the tenant to which the user switched is tenant_name 'qascope'. DPI inline proxy 162 parses this information from live traffic, extracts these details and populates the event data in the database. Because the guest user can be identified as an external unsanctioned tenant via the #EXT# tag, as described above, DPI inline proxy 162 can apply granular policies to control sensitive data exposure actions requested. Using the disclosed DLP technology for Teams, sensitive content can be allowed in sanctioned corporate tenants and blocked in external corporate tenants and for personal tenants.

In one use case, the disclosed methods provide policy controls that limit malicious user actions to unsanctioned tenants.

In another user case, the disclosed system identifies sensitive data exchange actions, including post, upload and share, and enables limits and controls of the identified data exchange actions to prevent sensitive actions from being performed by any malicious user on an unsanctioned Teams tenant instance.

In a third use case, the disclosed technology applies data loss prevention (DLP) profiles on instance-based policy. The disclosed technology enhances threat protection for an enterprise that utilizes Microsoft Teams.

The technology offers fine-grained control by an organization administrator to specify different access policies that control the user actions performed in any specific external tenant Team workspace. We describe a computer system for securing Teams against unauthorized data exfiltration and against receiving malicious files from external users next.

Computer System

Figure 8:
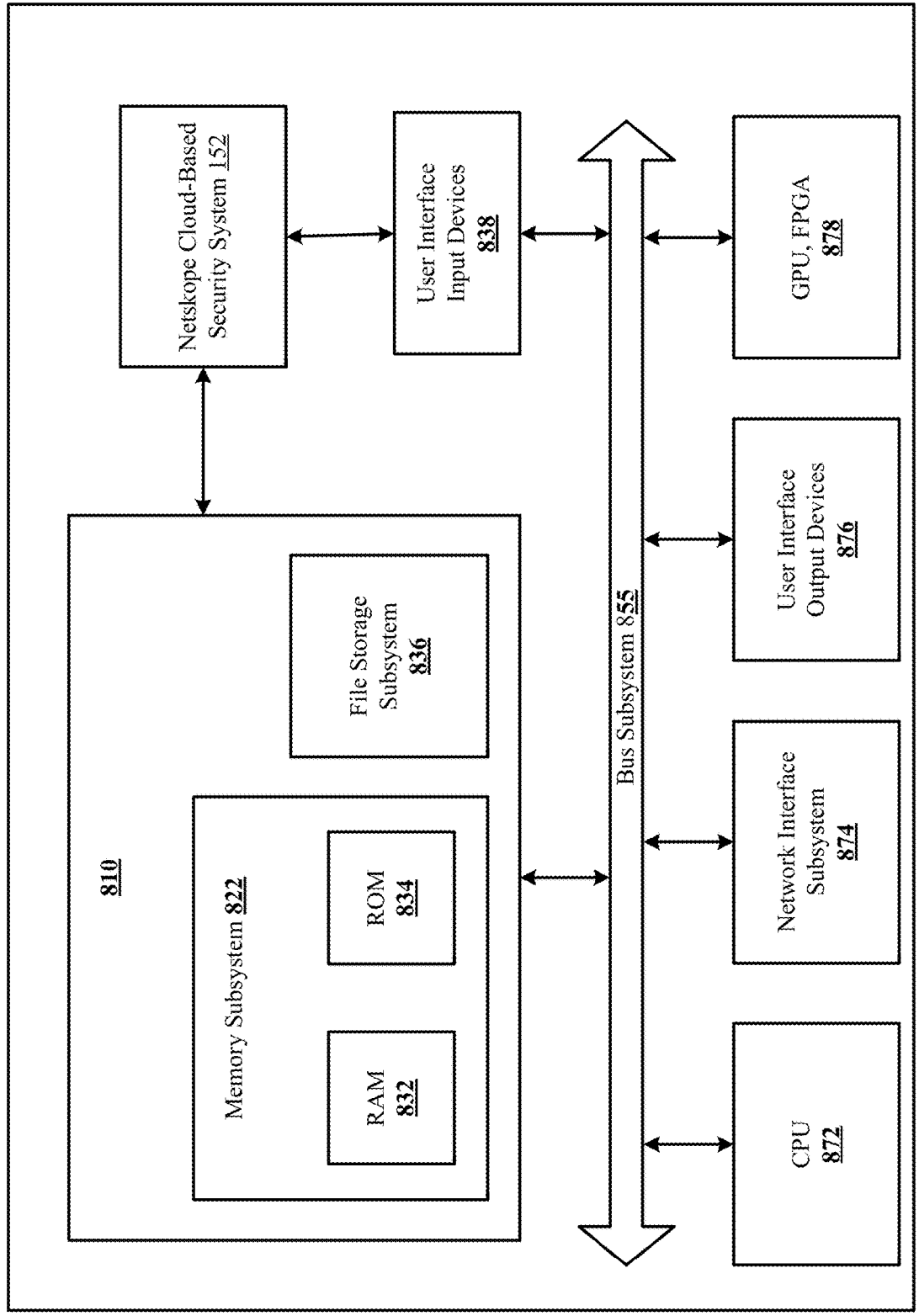
FIG. 8 is a simplified block diagram of a computer system that can be used for securing Teams against unauthorized data exfiltration and against receiving malicious files from external users, in accordance with an implementation of the disclosed technology.

FIG. 8 is a simplified block diagram of a computer system 800 that can be used for securing Teams against unauthorized data exfiltration and against receiving malicious files from external users. Computer system 800 includes at least one central processing unit (CPU) 872 that communicates with a number of peripheral devices via bus subsystem 855, and cloud-based security system 152 for providing network security services described herein. These peripheral devices can include a storage subsystem 810 including, for example, memory devices and a file storage subsystem 836, user interface input devices 838, user interface output devices 876, and a network interface subsystem 874. The input and output devices allow user interaction with computer system 800. Network interface subsystem 874 provides an interface to outside networks, including an interface to corresponding interface devices in other computer systems.

In one implementation, cloud-based security system 152 of FIG. 1 is communicably linked to the storage subsystem 810 and the user interface input devices 838.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein. Subsystem 878 can be graphics processing units (GPUs) or field-programmable gate arrays (FPGAs).

Memory subsystem 822 used in the storage subsystem 810 can include a number of memories including a main random-access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or less components than the computer system depicted in FIG. 8.

Particular Implementations

Some particular implementations and features for securing a collaboration tool against unauthorized data exfiltration and for securing a collaboration tool against receiving malicious files from external guest users are described in the following discussion.

In one disclosed implementation, a method of securing a collaboration tool against unauthorized data exfiltration includes setting policies applicable to exfiltration of files to users in an external guest user category and uploading of the users in the external guest user category, including using an in-line proxy that intercepts a pair of an add request and add response for adding an invited user to a team, in which the add response contains a tag identifying the invited user as belonging to the external guest user category, but the add request itself does not identify the invited user as belonging to the external guest user category. The method also includes storing metadata identifying the invited user as belonging to the external guest user category for application of the policies applicable to the guest user category, and using an in-line proxy that intercepts a particular pair of a request and response for file transfer involving a particular user, to identify the particular user, in which neither the request nor the response for file transfer in the particular pair indicate whether the particular user belongs to the external guest user category. The method further includes looking up the particular user in the stored metadata and identifying the particular user as belonging to the external guest user category, and looking up at least one policy applicable to the guest user category and applying the policy to the particular request for file transfer. Responsive to the applicable policy, the method also includes invoking deep packet inspection (DPI) and detecting that the file referenced in the particular request contains sensitive information not permitted by the policy to be transferred by the particular user in the external guest user category, and blocking transfer of the file that contains sensitive information.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation, the disclosed method further includes the DPI detecting that the file referenced in the particular request originates from a blacklisted website or URL. In some implementations, the stored metadata is represented using JSON. In another implementation the metadata could be represented via YAML, Protobuf, Avro, MongoDB or OData or another language with key-value pairs.

In many implementations, the tag identifying the invited user as belonging to the external guest user category is represented as an #EXT# tag.

In one disclosed implementation, a method of securing a collaboration tool against receiving malicious files from external guest users includes setting policies applicable to infiltration of files from an external guest user category and uploading of the users in the external guest user category, including using a proxy that intercepts a pair of an add request and add response for adding an invited user to a team, wherein the add response contains a tag identifying the invited user as belonging to the external guest user category, but the add request itself does not identify the invited user as belonging to the external guest user category. The method also includes storing metadata identifying the invited user as belonging to the external guest user category for application of the policies applicable to the guest user category, using a proxy that intercepts a particular pair of a request and response for file transfer involving a particular user, to identify the particular user, in which neither the request nor the response for file transfer in the particular pair indicate whether the particular user belongs to the external guest user category. The method further includes looking up the particular user in the stored metadata and identifying the particular user as belonging to the external guest user category, and looking up at least one policy applicable to the guest user category and applying the policy to the particular request for file transfer. Responsive to the applicable policy, the method also includes invoking DPI and detecting that the file referenced in the particular request contains at least one undesired file not permitted by the policy to be uploaded by the particular user in the external guest user category, and blocking upload of the file that contains malicious content.

For some implementations of the disclosed method, the undesired file includes known malicious data signatures and in some cases the undesired file includes a macro having malicious code.

Other implementations of the methods described in this section can include a tangible non-transitory computer readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method executed by a hardware processor for securing a collaboration tool against unauthorized data exfiltration, including:
   setting policies applicable to exfiltration of files to users in an external guest user category and uploading of files by the users in the external guest user category;
   using an in-line proxy that intercepts a pair of communication platform add request and add response API messages for adding an invited user to a team, wherein the add response message contains an #EXT# tag identifying the invited user as belonging to the external guest user category, but the add request message itself identifies the invited user without indicating whether the invited user belongs to the external guest user category;
   in response to determining, by the in-inline proxy, that the add response includes the #EXT# tag, storing metadata in a storage that is external to the communication platform, the metadata identifying the invited user as belonging to the external guest user category for application of the policies applicable to the external guest user category;
   using the in-line proxy to intercept a particular pair of a request and response of the communication platform for file transfer involving a particular user and a referenced file, and to identify the particular user, wherein neither the request nor the response for file transfer in the particular pair indicate whether the particular user belongs to the external guest user category;
   looking up the particular user in the externally stored metadata and identifying the particular user as belonging to the external guest user category;
   looking up at least one policy of the policies applicable to the external guest user category and applying the at least one policy to the particular request for file transfer;
   responsive to the at least one policy, invoking deep packet inspection (abbreviated DPI) and detecting that the file referenced in the particular request contains sensitive information not permitted by the at least one policy to be transferred to the particular user in the external guest user category; and blocking transfer of the file that contains sensitive information.

2. The computer-implemented method of claim 1, further including the DPI detecting that the file referenced in the particular request originates from a blacklisted website or URL.

3. The computer-implemented method of claim 1, wherein the externally stored metadata is represented using JSON.

4. A computer-implemented method executed by a hardware processor for securing a collaboration tool against receiving malicious-content files from external guest users, including:

setting policies applicable to infiltration of files from an external guest user category and downloading of files by the users in the external guest user category;

using an in-line proxy that intercepts a pair of communication platform add request and add response API messages for adding an invited user to a team, wherein the add response message contains an #EXT# tag identifying the invited user as belonging to the external guest user category, but the add request message itself identifies the invited user without indicating whether the invited user belongs to the external guest user category;

in response to determining, by the in-line proxy, that the add response includes the #EXT# tag, storing metadata in a storage that is external to the communication platform, the metadata identifying the invited user as belonging to the external guest user category for application of the policies applicable to the external guest user category;

using the in-line proxy to intercept a particular pair of a request and response of the communication platform for file transfer involving a particular user and a referenced file, and to identify the particular user, wherein neither the request nor the response for file transfer in the particular pair indicate whether the particular user belongs to the external guest user category;

looking up the particular user in the externally stored metadata and identifying the particular user as belonging to the external guest user category;

looking up at least one policy of the policies applicable to the external guest user category and applying the at least one policy to the particular request for file transfer;

responsive to the at least one policy, invoking deep packet inspection (abbreviated DPI) and detecting that the file referenced in the particular request contains at least one undesired file not permitted by the at least one policy to be downloaded by the particular user in the external guest user category; and blocking download of the at least one undesired file.

5. The computer-implemented method of claim 4, wherein the at least one undesired file includes known malicious data signatures.

6. The computer-implemented method of claim 4, wherein the at least one undesired file includes a macro having malicious code.

7. A tangible non-transitory computer readable storage medium, including program instructions loaded into memory that, when executed on processors, cause the processors to implement a method of securing a collaboration tool against unauthorized data exfiltration, including:

setting policies applicable to exfiltration of files to users in an external guest user category and uploading of files by the users in the external guest user category;

using an in-line proxy that intercepts a pair of communication platform add request and add response API messages for adding an invited user to a team, wherein the add response message contains an #EXT# tag identifying the invited user as belonging to the external guest user category, but the add request message itself identifies the invited user without indicating whether the invited user belongs to the external guest user category;

in response to determining, by the in-inline proxy, that the add response includes the #EXT# tag, storing metadata in a storage that is external to the communication platform, the metadata identifying the invited user as belonging to the external guest user category for application of the policies applicable to the external guest user category;

using the in-line proxy to intercept a particular pair of a request and response of the communication platform for file transfer involving a particular user and a referenced file, and to identify the particular user, wherein neither the request nor the response for file transfer in the particular pair indicate whether the particular user belongs to the external guest user category;

looking up the particular user in the externally stored metadata and identifying the particular user as belonging to the external guest user category;

looking up at least one policy of the policies applicable to the external guest user category and applying the at least one policy to the particular request for file transfer;

responsive to the at least one policy, invoking deep packet inspection (abbreviated DPI) and detecting that the file referenced in the particular request contains sensitive information not permitted by the at least one policy to be transferred to the particular user in the external guest user category; and blocking transfer of the file that contains sensitive information.

8. The tangible non-transitory computer readable storage medium of claim 7, further including the DPI detecting that the file referenced in the particular request originates from a blacklisted website or URL.

9. A tangible non-transitory computer readable storage medium, including program instructions loaded into memory that, when executed on processors, cause the processors to implement a method of securing a collaboration tool against receiving malicious-content files from external guest users, including:

setting policies applicable to infiltration of files from an external guest user category and downloading of files by the users in the external guest user category;

using an in-line proxy that intercepts a pair of communication platform add request and add response API messages for adding an invited user to a team, wherein the add response message contains an #EXT# tag identifying the invited user as belonging to the external guest user category, but the add request message itself identifies the invited user without indicating whether the invited user belongs to the external guest user category;

in response to determining, by the in-line proxy, that the add response includes the #EXT# tag, storing metadata in a storage that is external to the communication platform, the metadata identifying the invited user as belonging to the external guest user category for application of the policies applicable to the external guest user category;

using the in-line proxy to intercept a particular pair of a request and response of the communication platform for file transfer involving a particular user and a referenced file, and to identify the particular user, wherein neither the request nor the response for file transfer in the particular pair indicate whether the particular user belongs to the external guest user category;

looking up the particular user in the externally stored metadata and identifying the particular user as belonging to the external guest user category;

looking up at least one policy of the policies applicable to the external guest user category and applying the policy to the particular request for file transfer;

responsive to the at least one policy, invoking deep packet inspection (abbreviated DPI) and detecting that the file referenced in the particular request contains at least one undesired file not permitted by the at least one policy to be downloaded by the particular user in the external guest user category; and blocking download of the at least one undesired file.

10. The tangible non-transitory computer readable storage medium of claim 9, wherein the at least one undesired file includes known malicious data signatures.

11. The tangible non-transitory computer readable storage medium of claim 9, wherein the at least one undesired file includes a macro having malicious code.

12. A system for securing a collaboration tool against unauthorized data exfiltration, the system including a processor, memory coupled to the processor, and computer instructions corresponding to the program instructions of the tangible non-transitory computer readable storage medium of claim 7 loaded into the memory and executable by the processor.

13. A system for securing a collaboration tool against receiving malicious files from external guest users, the system including a processor, memory coupled to the processor, and computer instructions corresponding to the program instructions of the tangible non-transitory computer readable storage medium of claim 9 loaded into the memory and executable by the processor.

14. The system of claim 13, wherein the at least one undesired file includes known malicious data signatures.

15. The system of claim 13, wherein the at least one undesired file includes a macro having malicious code.

* * * * *